United States Patent
Ganesan et al.

(10) Patent No.: US 9,703,652 B2
(45) Date of Patent: *Jul. 11, 2017

(54) VM AND HOST MANAGEMENT FUNCTION AVAILABILITY DURING MANAGEMENT NETWORK FAILURE IN HOST COMPUTING SYSTEMS IN A FAILOVER CLUSTER

(71) Applicant: VMWARE, INC., Palo Alto, CA (US)

(72) Inventors: Hariharan Jeyaraman Ganesan, Bangalore (IN); Jinto Antony, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 142 days.

This patent is subject to a terminal disclaimer.

(21) Appl. No.: 14/337,265

(22) Filed: Jul. 22, 2014

(65) Prior Publication Data

US 2015/0355982 A1 Dec. 10, 2015

(30) Foreign Application Priority Data

Jun. 7, 2014 (IN) .......................... 2801/CHE/2014

(51) Int. Cl.
| | | |
|---|---|---|
| G06F 11/00 | (2006.01) | |
| G06F 11/20 | (2006.01) | |
| G06F 9/455 | (2006.01) | |
| H04L 12/24 | (2006.01) | |
| H04L 12/26 | (2006.01) | |

(52) U.S. Cl.
CPC ...... *G06F 11/2023* (2013.01); *G06F 9/45558* (2013.01); *H04L 41/5025* (2013.01); *G06F 2009/4557* (2013.01); *G06F 2009/45591* (2013.01); *G06F 2009/45595* (2013.01); *G06F 2201/815* (2013.01); *H04L 43/10* (2013.01)

(58) Field of Classification Search
CPC ............ G06F 11/2023; G06F 11/3006; G06F 11/0709
See application file for complete search history.

(56) References Cited

U.S. PATENT DOCUMENTS

| | | | |
|---|---|---|---|
| 7,213,246 | B1* | 5/2007 | van Rietschote ... G06F 11/1482 707/999.202 |
| 8,185,776 | B1 | 5/2012 | Gentes et al. |
| 8,201,169 | B2 | 6/2012 | Venkitachalam et al. |
| 2005/0071470 | A1* | 3/2005 | O'Brien ............. G06F 11/2097 709/226 |
| 2005/0108593 | A1 | 5/2005 | Purushothaman et al. |
| 2006/0112297 | A1* | 5/2006 | Davidson ............ G06F 11/1438 714/2 |

(Continued)

*Primary Examiner* — Bryce Bonzo
*Assistant Examiner* — Jonathan Gibson (57) ABSTRACT

Techniques for virtual machine (VM) management function availability during management network failure in a first host computing system in a cluster are described. In one example embodiment, management network failure is identified in the first host computing system. The management network being coupled to virtual management software in a management server and used for VM and host management functions. VM and host management functions on the first host computing system are then initiated via a failover agent associated with an active host computing system that is connected to the management network in the cluster and a shared storage network.

24 Claims, 4 Drawing Sheets

(56) References Cited

U.S. PATENT DOCUMENTS

2008/0189468 A1* 8/2008 Schmidt ............... G06F 11/203
                                                    711/6
2012/0159235 A1   6/2012 Suganthi et al.
2012/0278801 A1  11/2012 Nelson et al.

* cited by examiner

VM AND HOST MANAGEMENT FUNCTION AVAILABILITY DURING MANAGEMENT NETWORK FAILURE IN HOST COMPUTING SYSTEMS IN A FAILOVER CLUSTER

RELATED APPLICATION

Benefit is claimed under 35 U.S.C. 119(a)-(d) to Foreign application Serial No. 2801/CHE/2014 filed in India entitled "VM AND HOST MANAGEMENT FUNCTION AVAILABILITY DURING MANAGEMENT NETWORK FAILURE IN HOST COMPUTING SYSTEMS IN A FAILOVER CLUSTER", filed on Jun. 7, 2014, by VMware, Inc., which is herein incorporated in its entirety by reference for all purposes.

BACKGROUND

Today's trend is to configure separate networks for management, virtual machines (VMs) and migration of VMs in virtual datacenters. Typically, in such virtual datacenters a set of virtualization-based distributed infrastructure services provides virtual machine monitoring and management to automate and simplify provisioning, optimize resource allocation, and provide operating system and application-independent high availability to applications at lower cost and without the complexity of solutions used with static, physical infrastructure and other such environments. One of these distributed services is a failover service, which provides easy-to-manage, cost-effective (high availability) HA clusters for all applications running on VMs that are often used for critical databases, file sharing on a network, business applications, and customer services, such as electronic commerce websites. In the event of a server hardware failure, affected VMs are automatically restarted on other physical servers during a failover operation to reduce downtime and information technology (IT) service disruption and to further reduce any dedicated standby hardware and installation of additional software requirements.

However, if a host computing system is partially isolated (i.e., isolated from management and not the migration and virtual machine network) from the other host computing systems in a high availability (HA) cluster in the virtual datacenter, any VMs running on the partially isolated host computing system are disconnected from the virtual management system (SMS). In such a scenario, any VMs running on the partially isolated host are kept powered on may not have VM and host management functions, such as virtual machine monitoring and management to automate and simplify provisioning, optimize resource allocation, and provide operating system and application-independent high availability to applications as the management network is isolated from the failed host computing system.

SUMMARY

One or more embodiments disclosed herein provide a method for VM availability during management and VM network failures in host computing systems in a cluster in a virtual datacenter. In one aspect, the method includes identifying management network failure in a first host computing system. The management network being coupled to virtual management software residing in a management server and used for VM and host management functions. Further, the method includes initiating VM and host management functions on the first host computing system via a failover agent associated with an active host computing system that is connected to the management network in the cluster.

Further embodiments of the present disclosure include a non-transitory computer-readable storage medium that includes instructions that enable a processing unit to implement one or more of the methods set forth above or the functions of the computer system set forth above. In one embodiment, a non-transitory computer-readable storage medium is provided having instructions that manage execution of a virtual machine. The instructions, when executed in a computing device, perform the steps identifying management network failure in a first host computing system. The management network being coupled to virtual management software residing in a management server and used for VM and host management functions. The instructions further includes initiating VM and host management functions on the first host computing system via a failover agent associated with an active host computing system—that is connected to the management network in the cluster.

Embodiments of the present disclosure provide a computer system. The computing system includes multiple host computing systems in a cluster in a virtual datacenter. The computing system further includes a management network, a VM network and a migration network that are communicatively coupled to the multiple host computing systems. Moreover, the computing system includes a management server that is communicatively coupled to the management network, wherein the management server includes a virtual management software including a failover module and each of the multiple host computing systems includes an associated failover agent, wherein the failover module and the each failover agent are configured for providing VM and host management function availability during management network failure in a first host computing system in a cluster in the virtual datacenter.

DETAILED DESCRIPTION

Embodiments described herein provide VM and host management function availability during management network failure in host computing systems in a virtual datacenter. The proposed technique provides the VM and host management function to the partially isolated host computing system via a failover agent associated with another one of non-isolated host computing systems in the cluster and shared storage network. The proposed technique leverages available communication between failover agents via a heartbeat channel through shared storage network to provide VM and host management functionality to partially isolated host computing system. Furthermore, implementation of this technique can be carried out without requiring any additional hardware. Also, redundancy can be achieved during network failures with no additional hardware.

System Overview and Examples of Operation

Figure 1A:
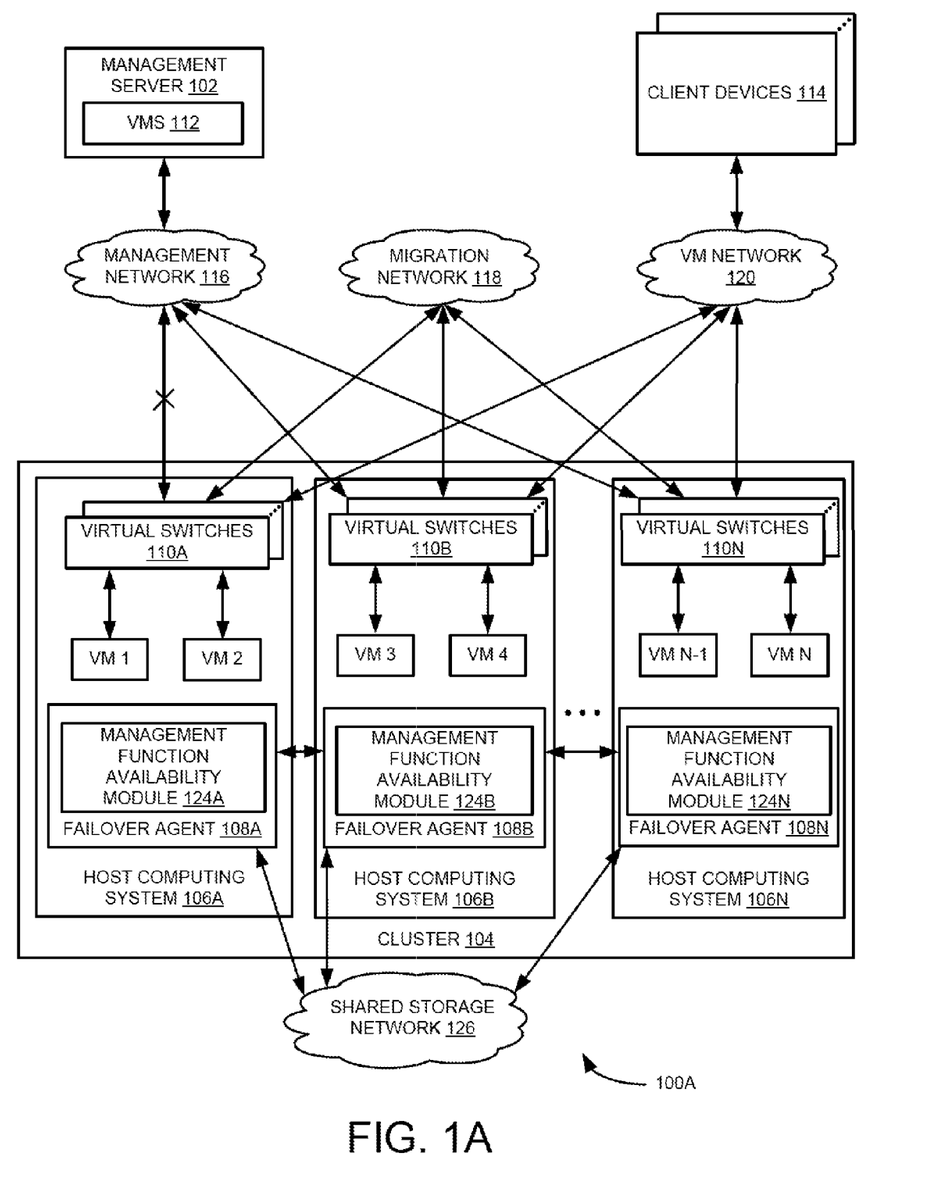
FIGS. 1A and 1B are block diagrams illustrating system for VM and host management function availability during management network failure in host computing systems present in a cluster in a virtual datacenter, according to an example embodiment.
Figure 1B:
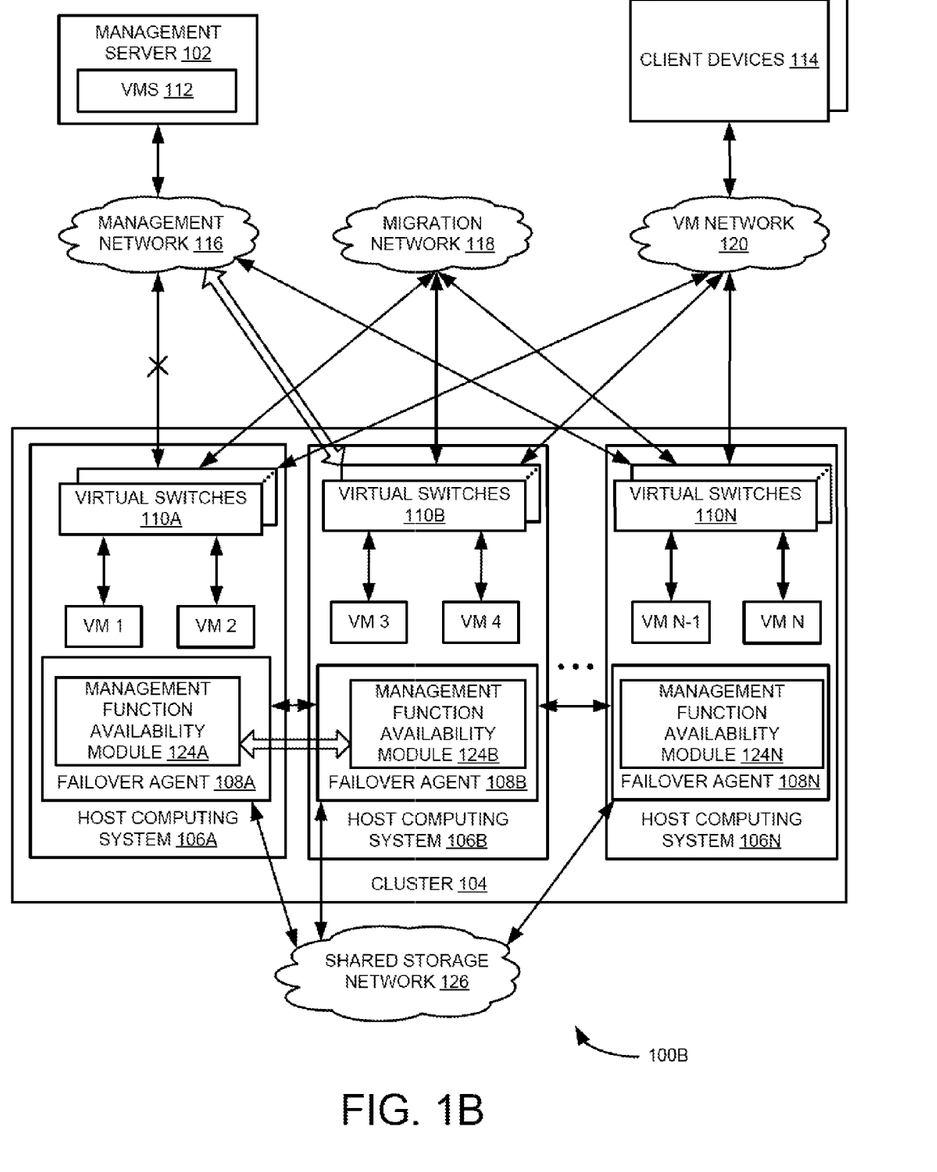

FIG. 1A is a block diagram illustrating system 100 for providing VM and host management function availability during management network failure in host computing systems in a cluster in a virtual datacenter, according to an example embodiment. As shown in FIG. 1A, system 100A includes multiple host computing systems 106A-N and associated virtual machines (VMs) VM1-N hosted by multiple host computing systems 106A-N in a cluster 104. Also as shown in FIG. 1A, system 100A includes management server 102 that is communicatively coupled to multiple host computing systems 106B-N via management network 116 except for lost/failed connectivity between management network 116 and host computing system 106A. Further as shown in FIG. 1A, management server 102 includes virtual management software (VMS) 112. Furthermore as shown in FIG. 1A, multiple host computing systems 106A-N include associated failover agents 108A-N. Moreover as shown in FIG. 1A, multiple host computing systems 106A-N are communicatively coupled to migration network 118 and VM network 120 via associated virtual switches 110A-N. In addition, as shown in FIG. 1A. VM network is communicatively coupled to client devices 114. Also as shown in FIG. 1A, each of multiple host computing systems 106A-N is connected to shared storage network 126. Further as shown in FIG. 1A, each of failover agents 108A-N include associated one of management function availability modules 124A-N and Management function availability modules 124A-N are communicatively coupled with each other via shared storage network 126. FIG. 1B is similar to FIG. 1A, except FIG. 1B shows VM and host management function availability to host computing system 106A via management function availability modules 124A and 124B, host computing system 106B and management network 116.

In operation, management function availability module 124A residing in failover agent 108A identifies management network failure (as shown in FIG. 1, failed connectivity between virtual switches 110A and management network 116) with first host computing system 106A (i.e., partially isolated host computing system 106A). In these embodiments, management network is communicatively coupled to VMS 112 residing in management server 112. As shown in FIG. 1B, management function availability module 124A in the failover agent 108A then initiates VM and host management functions on partially isolated first host computing system 106A via a failover agent associated with an active host computing system 106B-N connected to management network 116 in cluster 114. FIG. 1B shows fail over agent 108A associated with non-active first host computing system 106A initiating VM and host management functions to non-active first host computing system 106A via fail over agent 108B associated with active host computing system 106B.

In some embodiments, failover agent 108A associated with partially isolated first host computing system 106A initiates VM and host management functions on the partially isolated first host computing system 106A via the failover agent 106B-N and their associated heartbeat channel through shared storage network 126 associated with active host computing system 106A-N that is connected to management network 116 in cluster 104. Further in some embodiments, failover agent 108A associated with partially isolated first host computing system 106A, upon identifying the partial failure in first host computing system 106A connectivity with the management network 114, selects the failover agent 108B-N associated with the active host computing system 106B-N in cluster 104 (in the example embodiment shown in FIGS. 1A and 1B, failover agent 108A selects failover agent 108B) and notifies management network 116 to initiate VM and host management functions to the partially failed first host computing system 106A via failover agent 108B. VMS 112 then performs VM and host management functions to the first host computing system via the failover agent 108B associated with selected active host computing system 106B in cluster 104 and through associated heartbeat channel via shared storage network 126.

In these embodiments, VMS 112 initiates migration of VMs VM1-N running on partially isolated first host computing system 106A via failover agent 108B associated with the selected one of active host computing systems 106B in cluster 104 and associated heartbeat channel via shared storage network 126. In some embodiments, VMS 112 initiates migration of VMs VM1-N based on last updated computing resource availability information at each host computing system in cluster 104, wherein the computing resource availability information at each active host computing system is updated in the failover agent by periodically synchronizing with the management server.

Further in these embodiments, VMS 112 initiates migration of VMs VM1-2 running on first host computing system 106A to at least one other host computing system 106B-N in cluster 104 via failover agent 108B associated with selected active host computing system 106B in cluster 104 and associated heartbeat channel via shared storage network 126. In some embodiments, VMS 112 initiates migration of VMs VM1-N based on updated computing resource availability information substantially before identification of the management network failure at first host computing system 106A. In these embodiments, the computing resource availability information in failover agents 108A-N associated with host computing systems 106 A-N is updated by periodically synchronizing with VMS 112 residing in management server 102.

In some embodiments, management function availability module 124A residing in failover agent 108A declares the first host computing system 106A as management isolated host computing system upon identifying the management network failure in first host computing system 106A. Further in these embodiments, management function availability module 124A removes first host computing system 106A from the managed isolated host computing system mode and places first host computing system 106A on active mode status upon management network 116 associated with first host computing system 106A coming back to active mode from the management network failure in cluster 104.

In some embodiments, management function availability module 124A associated with partially isolated first host computing system 106A determines whether management network 116 associated with partially isolated first host computing system 106A is restored. Based on the outcome of the determination, if partially isolated first host computing system 106A is restored, then management function availability module 124A removes first host computing system 106A from the managed isolated host computing system mode. Furthermore, module 124A places first host computing system 106A on active mode upon the management network 116 associated with first host computing system 106A coming back to active mode from the management network failure in the virtual datacenter. Based on the outcome of the determination if partially isolated first host computing system is not restored, then management function availability module 124A determines whether the quality of service (QoS) of management network 116 in operation is above a predetermined threshold value. Further based on the outcome of the determination, if the QoS of management network 116 during operation is above or equal to the predetermined threshold value, then management function availability module 124A initiates VM and host management functions on first host computing system 106A via the failover agent 108B-N and associated heartbeat channel through shared storage network 126 that is connected to the active management network 116 in the cluster 104. Based on the outcome of the determination if the QoS of the management network during operation is below the predetermined threshold value, then management availability function module 124A places the partially isolated first computing system 124A into maintenance mode.

Also, although certain terms are used primarily herein, other terms could be used interchangeably to yield equivalent embodiments and examples. For example, the term "host computing system" may be used interchangeably with "physical host", "physical machine" or "physical device". Further for example, it is well-known that equivalent terms in the field of system virtualization or similar or related fields could be substituted for such terms as "physical computer," "hypervisor," "virtual machine," or the like. Further, the terms "virtual computing environment" and "virtual datacenter" are used interchangeably throughout the document. The terms "network failure", "network connectivity failure", and "lost network connectivity" are used interchangeably throughout the document.

Numerous specific details are set forth herein, such as data formats and code sequences and the like, in order to provide a thorough understanding of the described techniques. The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Example Processes

Figure 2:
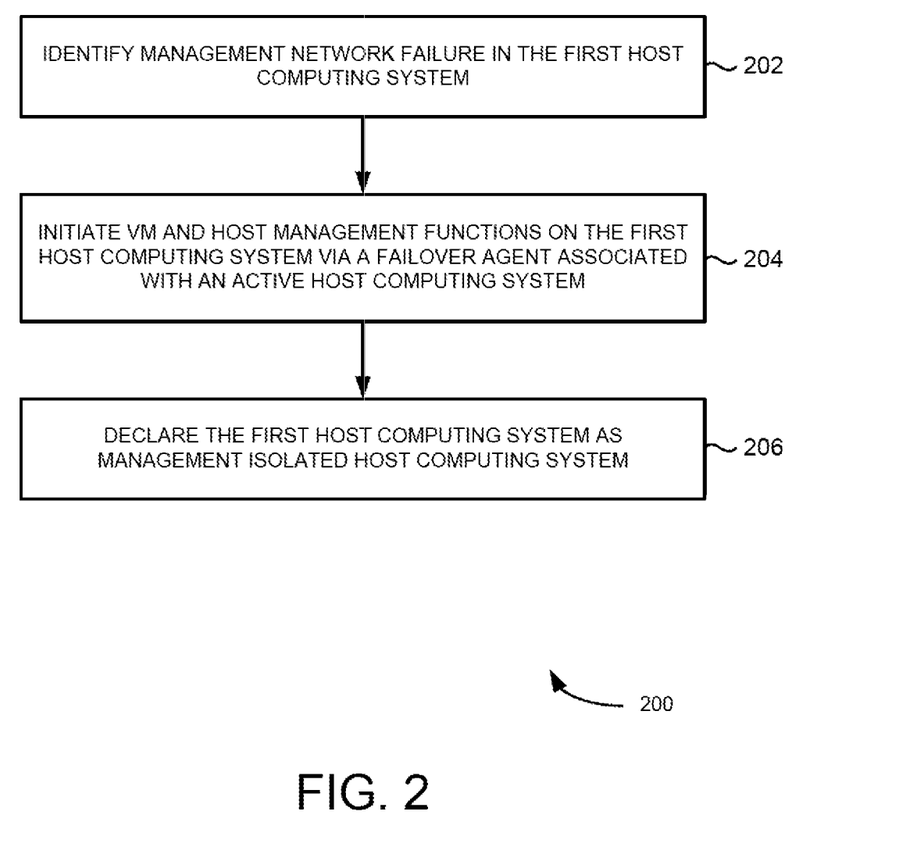
FIG. 2 is a flow diagram of process for VM and host management function availability during management network failure in host computing systems in a virtual datacenter, according to an example embodiment.

FIG. 2 is a flow diagram of process 200, for providing VM and host management function availability during management network failure in host computing systems in a cluster in a virtual datacenter, according to an example embodiment.

At block 202, process 200 identifies management network failure in the first host computing system. In these embodiments, the management network being coupled to virtual management software in a management server and used for VM and host management functions. At block 204, process 200 initiates VM and host management functions on the first host computing system via a failover agent associated with an active host computing system that are connected to the management network in the cluster. At block 206, process 200 declares the first host computing system as management isolated host computing system upon identifying management network failure in the first host computing system.

Process 200 for providing VM and host management function availability during management network failure in host computing systems in a cluster in a virtual datacenter is explained in more detail above with reference to the system diagrams 100A and 100B shown in FIGS. 1A and 1B, respectively.

Figure 3:
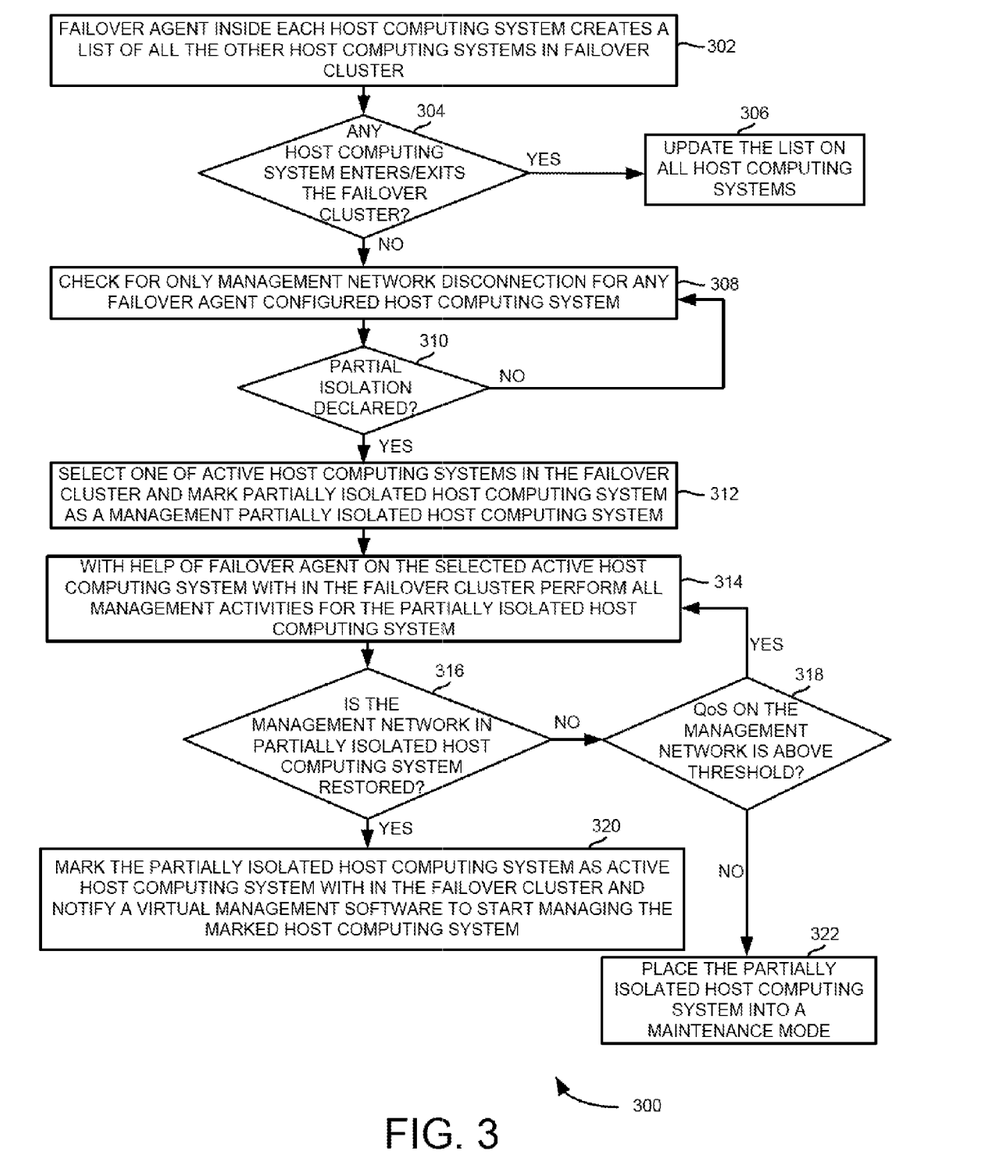
FIG. 3 is another flow diagram of process for VM and host management function availability during management network failure in host computing systems in a virtual datacenter, according to an example embodiment.

FIG. 3 is a flow diagram of another process 300, for providing VM and host management function availability during management network failure in host computing systems in a cluster in a virtual datacenter, according to an example embodiment.

At block 302, each failover agent associated with a host computing system creates and maintains a list of all available host computing systems in the cluster. At block 304, a determination is made as to whether any host computing system enters/exits in the cluster. At block 306, the list in each host computing system is updated if there is any entry/exit in the cluster.

At block 308, a check is made if any of the failover agents in the cluster for disconnection with management network in the cluster if there is no entry/exit in the cluster. Based on the checking at block 308, if there is management network disconnection with any of the failover agents in the cluster, the process 300 at block 310 declares a partial isolation of the host computing system associated with the failover agent disconnected with the management network.

At block 312, one of active host computing systems in the cluster is selected and partially isolated host computing system is marked as a management isolated host computing system. At block 314, all management activities for the partially isolated host computing system is performed using the failover agent associated with the selected active host computing system.

At block 316, a determination is made as to whether the management network associated with the partially isolated host computing system is restored. At block 320, the partially isolated host computing system is marked as active host computing system in the cluster and a VMS associated with the cluster is notified to start managing the marked active host computing system if the management network associated with the partially isolated host computing system is restored.

At block 318, a determination is made as to whether QoS associated with the management network is above a threshold. At block 322, the partially isolated host computing system is placed into a maintenance mode if the QoS associated with the management network is not above the threshold. The process 300 goes back to block 314 if the QoS associated with the management network is below or equal to the threshold.

The architecture shown in FIGS. 1-3 may in some embodiments be partially or fully virtualized. For example, systems 100-300 shown in FIGS. 1-3 may be one or possibly many VMs executing on physical hardware and managed by a hypervisor, VM monitor, or similar technology. Also, multiple host computing systems 106A-N shown in FIGS. 1-3 may include virtualization logic to manage multiple VMs.

In an example embodiment, components/modules of failover agents 108A-N are implemented using standard programming techniques. In other embodiments, failover agents 108A-N may be implemented as instructions processed by a VM that executes as one of other programs.

Furthermore, in some embodiments, some or all of the components of failover agents 108A-N may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

Further, from the foregoing it will be appreciated that, although specific embodiments have been described herein for purposes of illustration, various modifications may be made without deviating from the spirit and scope of this disclosure. For example, the methods, techniques, and systems for migrating VMs across host computing systems based on cache characteristics in a virtualized datacenter are applicable to other architectures or in other settings. For example, the described techniques may be employed as part of a cloud-based computing resource offering, wherein customers may pay to have higher importance levels associated with their activities, in order to obtain higher levels of service or availability. As another example, the described techniques may be employed to allocate resources or schedule CPU time at the process level within an operating system. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method for virtual machine (VM) management function availability during management network connectivity failure in a first host computing system in a cluster in a virtual datacenter, comprising:
    identifying management network connectivity failure between a management network and the first host computing system, wherein the management network being coupled to virtual management software in a management server and used for performing VM and host management functions on the first host computing system; and
    initiating the VM and host management functions on the first host computing system via a failover agent associated with an active host computing system that is connected to the management network in the cluster upon identifying the management network connectivity failure between the management network and the first host computing system, wherein initiating the VM and host management functions on the first host computing system via the failover agent associated with the active host computing system, comprises:
        initiating migration of VMs running on the first host computing system to at least one other active host computing system via a migration network using the failover agent associated with the active host computing system that is connected to the management network, wherein the migration network is different from the management network.

2. The method of claim 1, wherein initiating the VM and host management functions on the first host computing system via the failover agent associated with the active host computing system that is connected to the management network in the cluster, comprises:
    initiating the VM and host management functions on the first host computing system via the failover agent and associated heartbeat channel through shared storage network associated with the active host computing system that is connected to the management network in the cluster.

3. The method of claim 1, wherein initiating management functions on the first host computing system via the failover agent associated with the active host computing system that is connected to the management network in the cluster, comprises:
    selecting the active host computing system that is connected to the management network in the cluster for initiating management functions to the first host computing system; and
    performing the VM and host management functions to the first host computing system via the failover agent associated with selected active host computing system in the cluster and associated heartbeat channel through shared storage network.

4. The method of claim 3, wherein performing the VM and host management functions to the first host computing system via the failover agent associated with the selected active host computing system in the cluster and the associated heartbeat channel via the shared storage network, comprises:
    initiating migration of the VMs running on the first host computing system via the failover agent associated with the selected active host computing system in the cluster and the associated heartbeat channel via the shared storage network based on last updated computing resource availability information at each host computing system, wherein the computing resource availability information at each active host computing system is updated in the failover agent by periodically synchronizing with the management server.

5. The method of claim 4, wherein performing the VM and host management functions to the first host computing system via the failover agent associated with the selected active host computing system in the cluster and the associated heartbeat channel via the shared storage network, comprises:
    initiating migration of the VMs running on the first host computing system to the at least one other active host computing systems via the failover agent associated with the selected active host computing system in the cluster and the associated heartbeat channel through the shared storage network based on updated computing resource availability information substantially before identification of the management network connectivity failure at the first host computing system, wherein the computing resource availability information at each host computing system is updated in the failover agent by periodically synchronizing with the management server.

6. The method of claim 1, further comprising:
    declaring the first host computing system as management isolated host computing system upon identifying management network connectivity failure in the first host computing system.

7. The method of claim 6, further comprising:
    removing the first host computing system from the managed isolated host computing system mode and placing the first host computing system on active mode upon the management network associated with the first host computing system coming back to active mode status from the management network connectivity failure in the virtual datacenter.

8. The method of claim 6, further comprising:
determining whether the management network associated with the partially isolated first host computing system restored;
if yes, removing the first host computing system from the managed isolated host computing system mode and placing the first host computing system on active mode upon the management network associated with the first host computing system coming back to active mode from the management network connectivity failure in the virtual datacenter;
if not, determining whether quality of service (QoS) of the management network is above a predetermined threshold value;
if the QoS of the management network in operation is above or equal to the predetermined threshold value, initiating the VM and host management functions on the first host computing system via the failover agent and associated heartbeat channel through shared storage network associated with the active host computing system that is connected to the management network in the cluster; and
if the QoS of the management network is below the predetermined threshold value, placing the partially isolated first computing system into maintenance mode.

9. A non-transitory computer-readable storage medium including instructions that are configured, when executed by a computing system, to perform a method for VM and host management function availability during management network connectivity failure in a first host computing system in a cluster, the method comprising:
identifying management network connectivity failure between a management network and the first host computing system, wherein the management network being coupled to virtual management software in a management server and used for VM and host management functions on the first host computing system; and
initiating the VM and host management functions on the first host computing system via a failover agent associated with an active host computing system that is connected to the management network in the cluster upon identifying the management network connectivity failure between the management network and the first host computing system, wherein initiating the VM and host management functions on the first host computing system via the failover agent associated with the active host computing system, comprises:
initiating migration of VMs running on the first host computing system to at least one other active host computing system via a migration network using the failover agent associated with the active host computing system that is connected to the management network, wherein the migration network is different from the management network.

10. The non-transitory computer-readable storage medium of claim 9, wherein initiating the VM and host management functions on the first host computing system via the failover agent associated with the active host computing system that is connected to the management network in the cluster, comprises:
initiating the VM and host management functions on the first host computing system via the failover agent and associated heartbeat channel through shared storage network associated with the active host computing system that is connected to the management network in the cluster.

11. The non-transitory computer-readable storage medium of claim 9, wherein initiating VM and host management functions on the first host computing system via the failover agent associated with the active host computing system that is connected to the management network in the cluster, comprises:
selecting one of the active host computing systems that are connected to the management network in the cluster for initiating management functions to the first host computing system; and
performing the VM and host management functions to the first host computing system via the failover agent associated with selected active host computing system in the cluster and associated heartbeat channel through shared storage network.

12. The non-transitory computer-readable storage medium of claim 11, wherein performing the VM and host management functions to the first host computing system via the failover agent associated with the selected active host computing system in the cluster and the associated heartbeat channel via the shared storage network, comprises:
initiating migration of the VMs running on the first host computing system via the failover agent associated with the selected active host computing system in the cluster and the associated heartbeat channel via the shared storage network based on last updated computing resource availability information at each host computing system, wherein the computing resource availability information at each active host computing system is updated in the failover agent by periodically synchronizing with the management server.

13. The non-transitory computer-readable storage medium of claim 12, wherein performing the VM and host management functions to the first host computing system via the failover agent associated with the selected active host computing system in the cluster and the associated heartbeat channel via the shared storage network, comprises:
initiating migration of the VMs running on the first host computing system to the at least one other host computing system via the failover agent associated with the selected active host computing system in the cluster and the associated heartbeat channel through the shared storage network based on updated computing resource availability information substantially before identification of the management network connectivity failure at the first host computing system, wherein the computing resource availability information at each host computing system is updated in the failover agent by periodically synchronizing with the management server.

14. The non-transitory computer-readable storage medium of claim 9, further comprising:
declaring the first host computing system as management isolated host computing system upon identifying management network connectivity failure in the first host computing system.

15. The non-transitory computer-readable storage medium of claim 14, further comprising:
removing the first host computing system from the managed isolated host computing system mode and placing the first host computing system on active mode upon the management network associated with the first host computing system coming back to active mode status from the management network connectivity failure in the virtual datacenter.

16. The non-transitory computer-readable storage medium of claim 14, further comprising:
  determining whether the management network associated with the partially isolated first host computing system restored;
  if yes, removing the first host computing system from the managed isolated host computing system mode and placing the first host computing system on active mode upon the management network associated with the first host computing system coming back to active mode from the management network connectivity failure in the virtual datacenter;
  if not, determining whether quality of service (QoS) of the management network is above a predetermined threshold value;
  if the QoS of the management network is above or equal to the predetermined threshold value, initiating the VM and host management functions on the first host computing system via the failover agent and associated heartbeat channel via shared storage network associated with the active host computing system that is connected to the management network in the cluster; and
  if the QoS of the management network is below the predetermined threshold value, placing the partially isolated first computing system into maintenance mode.

17. A computing system for VM availability during management and VM network failures in a first host computing system in a cluster, the system comprising:
  multiple host computing systems, wherein each host computing system hosting multiple VMs; and
  a management server communicatively coupled to the multiple host computing systems, wherein the management server comprising a virtual management software, and wherein each host computing system comprising an associated failover agent and a VM and host management function availability module residing in the associated failover agent, and they are configured to:
    identify management network connectivity failure between a management network and the first host computing system, wherein the management network being coupled to virtual management software in a management server and used for VM and host management functions on the first host computing system; and
    initiate the VM and host management functions on the first host computing system via a failover agent associated with an active host computing system that is connected to the management network in the cluster upon identifying the management network connectivity failure between the management network and the first host computing system, wherein the VM and host management functions are initiated on the first host computing system via the failover agent associated with the active host computing system, by:
      initiating migration of VMs running on the first host computing system to at least one other active host computing system via a migration network using the failover agent associated with the active host computing system that is connected to the management network, wherein the migration network is different from the management network.

18. The computing system of claim 17, wherein initiating the VM and host management functions on the first host computing system via the failover agent associated with the active host computing system that is connected to the management network in the cluster, comprises:
  initiating the VM and host management functions on the first host computing system via the failover agent and associated heartbeat channel through shared storage network associated with the active host computing system that is connected to the management network in the cluster.

19. The computing system of claim 17, wherein initiating the VM and host management functions on the first host computing system via the failover agent associated with the active host computing system that are connected to the management network in the cluster, comprises:
  selecting one of the active host computing systems that are connected to the management network in the cluster for initiating management functions to the first host computing system; and
  performing the VM and host management functions to the first host computing system via the failover agent associated with selected active host computing system in the cluster and associated heartbeat channel through shared storage network.

20. The computing system of claim 19, wherein performing the VM and host management functions to the first host computing system via the failover agent associated with the selected active host computing system in the cluster and the associated heartbeat channel via the shared storage network, comprises:
  initiating migration of the VMs running on the first host computing system via the failover agent associated with the selected active host computing system in the cluster and the associated heartbeat channel via the shared storage network based on last updated computing resource availability information at each host computing system, wherein the computing resource availability information at each active host computing system is updated in the failover agent by periodically synchronizing with the management server.

21. The computing system of claim 20, wherein performing the VM and host management functions to the first host computing system via the failover agent associated with the selected active host computing system in the cluster and the associated heartbeat channel via the shared storage network, comprises:
  initiating migration of the VMs running on the first host computing system to the at least one other host computing system via the failover agent associated with the selected active host computing system in the cluster and the associated heartbeat channel through the shared storage network based on updated computing resource availability information substantially before identification of the management network connectivity failure at the first host computing system, wherein the computing resource availability information at each host computing system is updated in the failover agent by periodically synchronizing with the management server.

22. The computing system of claim 17, further configured to:
  declaring the first host computing system as management isolated host computing system upon identifying management network connectivity failure in the first host computing system.

23. The computing system of claim 22, further configured to:
  removing the first host computing system from the managed isolated host computing system mode and placing the first host computing system on active mode upon the management network associated with the first host computing system coming back to active mode status from the management network connectivity failure in the virtual datacenter.

24. The computing system of claim 22, further configured to:
- determining whether the management network associated with the partially isolated first host computing system restored;
- if yes, removing the first host computing system from the managed isolated host computing system mode and placing the first host computing system on active mode upon the management network associated with the first host computing system coming back to active mode from the management network connectivity failure in the virtual datacenter;
- if not, determining whether quality of service (QoS) of the management network is above a predetermined threshold value;
- if the QoS of the management network is above or equal to the predetermined threshold value, initiating the VM and host management functions on the first host computing system via the failover agent and associated heartbeat channel via shared storage network associated with the active host computing system that is connected to the management network in the cluster; and
- if the QoS of the management network is below the predetermined threshold value, placing the partially isolated first computing system into maintenance mode.

* * * * *